US012627422B2

(12) United States Patent
Sakhnini et al.

(10) Patent No.: US 12,627,422 B2
(45) Date of Patent: May 12, 2026

(54) TECHNIQUES FOR MULTIPLEXING FOR UNIQUE WORD WAVEFORMS IN WIRELESS COMMUNICATIONS

(71) Applicant: QUALCOMM Incorporated, San Diego, CA (US)

(72) Inventors: Iyab Issam Sakhnini, San Diego, CA (US); Hemant Saggar, Irvine, CA (US); Tao Luo, San Diego, CA (US); Junyi Li, Fairless Hills, PA (US); Xiaoxia Zhang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 17/745,401

(22) Filed: May 16, 2022

(65) Prior Publication Data

US 2023/0370213 A1 Nov. 16, 2023

(51) Int. Cl.
*H04W 72/0453* (2023.01)
*H04L 5/00* (2006.01)

(52) U.S. Cl.
CPC ............ *H04L 5/001* (2013.01); *H04L 5/0046* (2013.01); *H04L 5/0098* (2013.01); *H04W 72/0453* (2013.01)

(58) Field of Classification Search
CPC ................................................... H04L 5/0098
USPC ......................................................... 370/331
See application file for complete search history.

(56) References Cited

U.S. PATENT DOCUMENTS

| | | | |
|---|---|---|---|
| 11,962,448 B2 | 4/2024 | Sakhnini et al. | |
| 2019/0028237 A1* | 1/2019 | Pan ..................... | H04L 27/2605 |
| 2019/0097859 A1* | 3/2019 | Bala ................... | H04L 27/2613 |

FOREIGN PATENT DOCUMENTS

| | | | |
|---|---|---|---|
| KR | 20170066338 A | * | 5/2017 |

OTHER PUBLICATIONS

Implem Computation Speed by IDIF using Ventation of 64-Bits Radix—8 IFFT for erilog (Year: 2020).*
Huemer M., et al., "Design and analysis of UW-OFDM signals", AEU—International Journal of Electronics and Communications, vol. 68, Issue 10, 2014, pp. 958-968.

(Continued)

*Primary Examiner* — Sibte H Bukhari
(74) *Attorney, Agent, or Firm* — QUALCOMM Incorporated

(57) ABSTRACT

Aspects described herein relate to multiplexing, in frequency and to generate a multiplexed set of data subcarriers, a first set of data subcarriers for a first user or a first channel with a second set of data subcarriers for a second user or a second channel, adding at least one set of redundant subcarriers to the multiplexed set of data subcarriers to be transmitted in a unique-word orthogonal frequency division multiplexing (UW-OFDM) waveform to produce at least one of head samples or tail samples for the UW-OFDM waveform, mapping the multiplexed set of data subcarriers and the at least one set of redundant subcarriers as input to an inverse fast Fourier transform (IFFT), and generating the UW-OFDM waveform based on an output of the IFFT.

26 Claims, 9 Drawing Sheets

(56)     References Cited

OTHER PUBLICATIONS

Huemer M., et al., "Non-Systematic Complex Number RS Coded OFDM by Unique Word Prefix", IEEE Transactions on Signal Processing, vol. 60, No. 1, Jan. 2012 , pp. 285-299, doi: 10.1109/ TSP.2011.2168522.
Huemer M., et al., "The Potential of Unique Words in OFDM", Proceeding 15th International OFDM-Workshop, Hamburg, Germany, 2010, pp. 140-144.

* cited by examiner

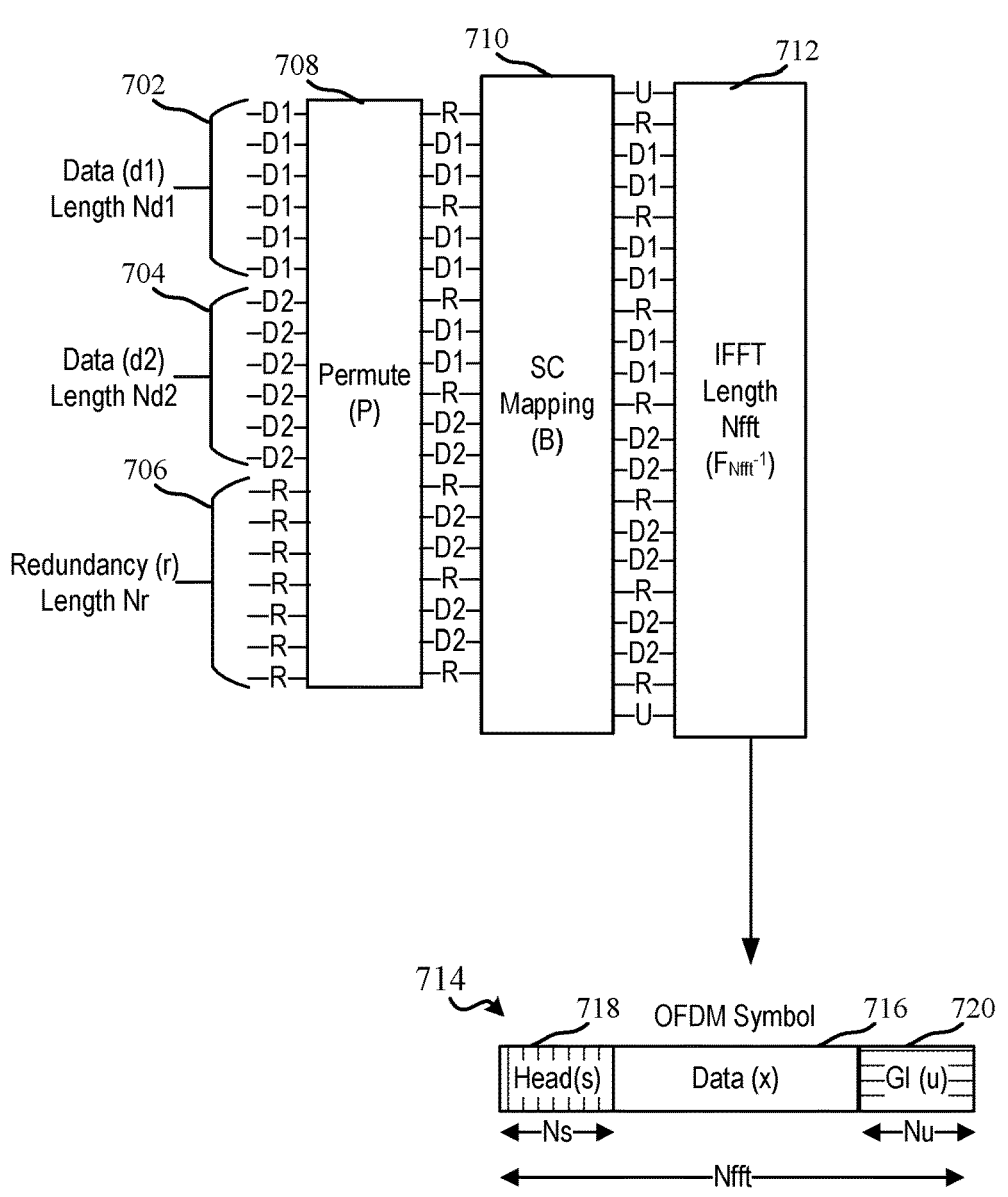
FIG. 7

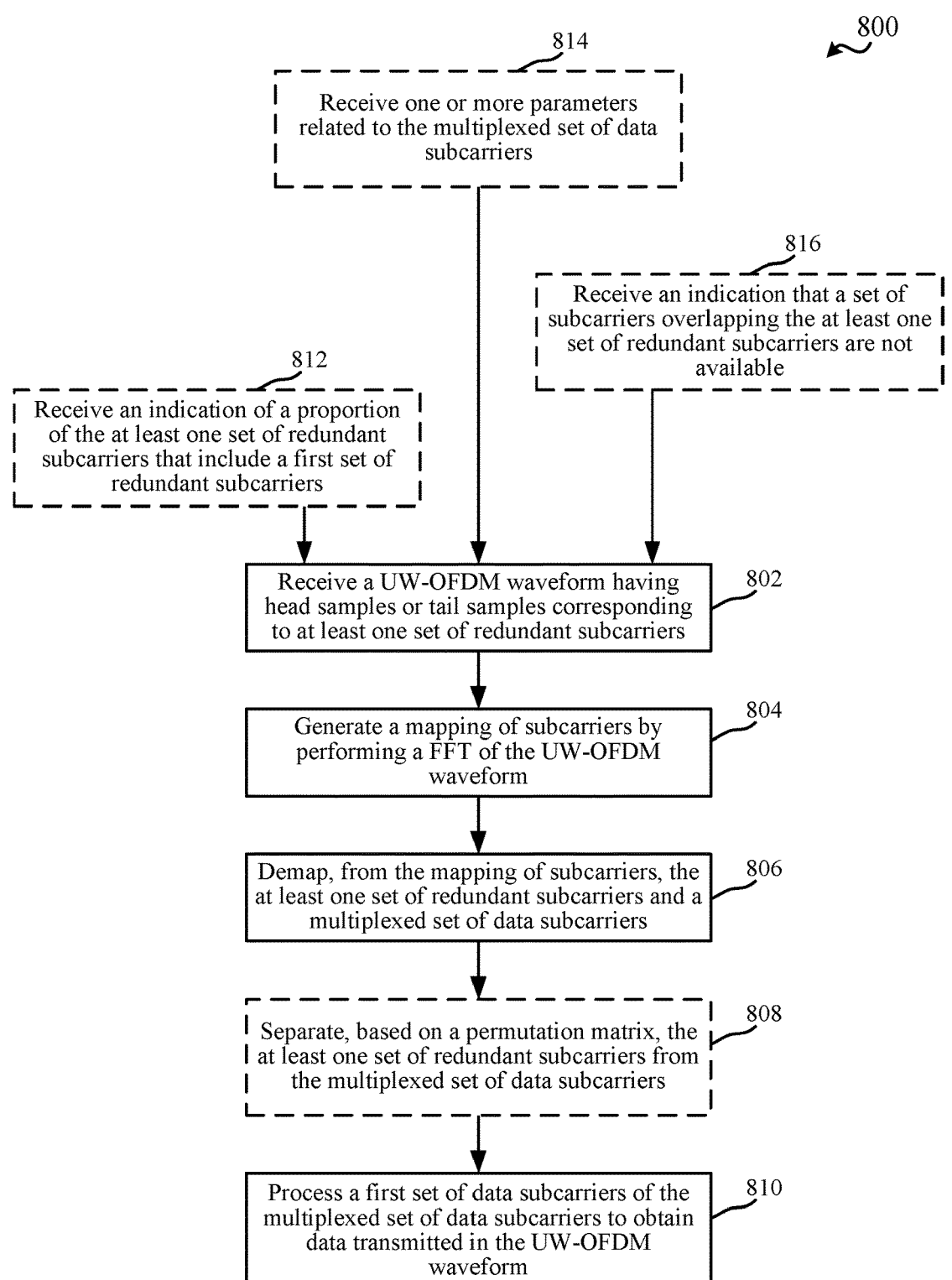

814

Receive one or more parameters related to the multiplexed set of data subcarriers

800

816

Receive an indication that a set of subcarriers overlapping the at least one set of redundant subcarriers are not available

812

Receive an indication of a proportion of the at least one set of redundant subcarriers that include a first set of redundant subcarriers Receive a UW-OFDM waveform having head samples or tail samples corresponding to at least one set of redundant subcarriers

802

Generate a mapping of subcarriers by performing a FFT of the UW-OFDM waveform

804

Demap, from the mapping of subcarriers, the at least one set of redundant subcarriers and a multiplexed set of data subcarriers

806

Separate, based on a permutation matrix, the at least one set of redundant subcarriers from the multiplexed set of data subcarriers

808

Process a first set of data subcarriers of the multiplexed set of data subcarriers to obtain data transmitted in the UW-OFDM waveform

TECHNIQUES FOR MULTIPLEXING FOR UNIQUE WORD WAVEFORMS IN WIRELESS COMMUNICATIONS

FIELD OF THE DISCLOSURE

Aspects of the present disclosure relate generally to wireless communication systems, and more particularly, to techniques for generating waveforms for wireless communications.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, waveforms generated for wireless communications can include cyclic prefix (CP)-orthogonal frequency division multiplexing (OFDM), single carrier (SC)-OFDM in a frequency division implementation, such as discrete Fourier transform (DFT)-spread (S)-OFDM, or SC-quadrature amplitude modulation (QAM) in time division implementation. In addition, a given waveform can include CP or guard interval (GI) to avoid inter-symbol interference between symbols of the waveform when transmitted or received in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication is provided that includes multiplexing, in frequency and to generate a multiplexed set of data subcarriers, a first set of data subcarriers for a first user or a first channel with a second set of data subcarriers for a second user or a second channel, adding at least one set of redundant subcarriers to the multiplexed set of data subcarriers to be transmitted in a unique-word orthogonal frequency division multiplexing (UW-OFDM) waveform to produce at least one of head samples or tail samples for the UW-OFDM waveform, mapping the multiplexed set of data subcarriers and the at least one set of redundant subcarriers as input to an inverse fast Fourier transform (IFFT), and generating the UW-OFDM waveform based on an output of the IFFT.

In another aspect, a method for wireless communication is provided that includes receiving a unique-word orthogonal frequency division multiplexing (UW-OFDM) waveform having head samples or tail samples corresponding to at least one set of redundant subcarriers, generating a mapping of subcarriers by performing a fast Fourier transform (FFT) of the UW-OFDM waveform, demapping, from the mapping of subcarriers, the at least one set of redundant subcarriers and a multiplexed set of data subcarriers, and processing a first set of data subcarriers of the multiplexed set of data subcarriers to obtain data transmitted in the UW-OFDM waveform.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 7 is a flow chart illustrating an example of a waveform generation process where data subcarriers can be multiplexed in a frequency domain along with a set of redundant subcarriers, in accordance with aspects described herein;

FIG. 8 is a flow chart illustrating an example of a method for processing a waveform of FDMed communications with redundant subcarriers, in accordance with aspects described herein.

DETAILED DESCRIPTION

Figure 1:
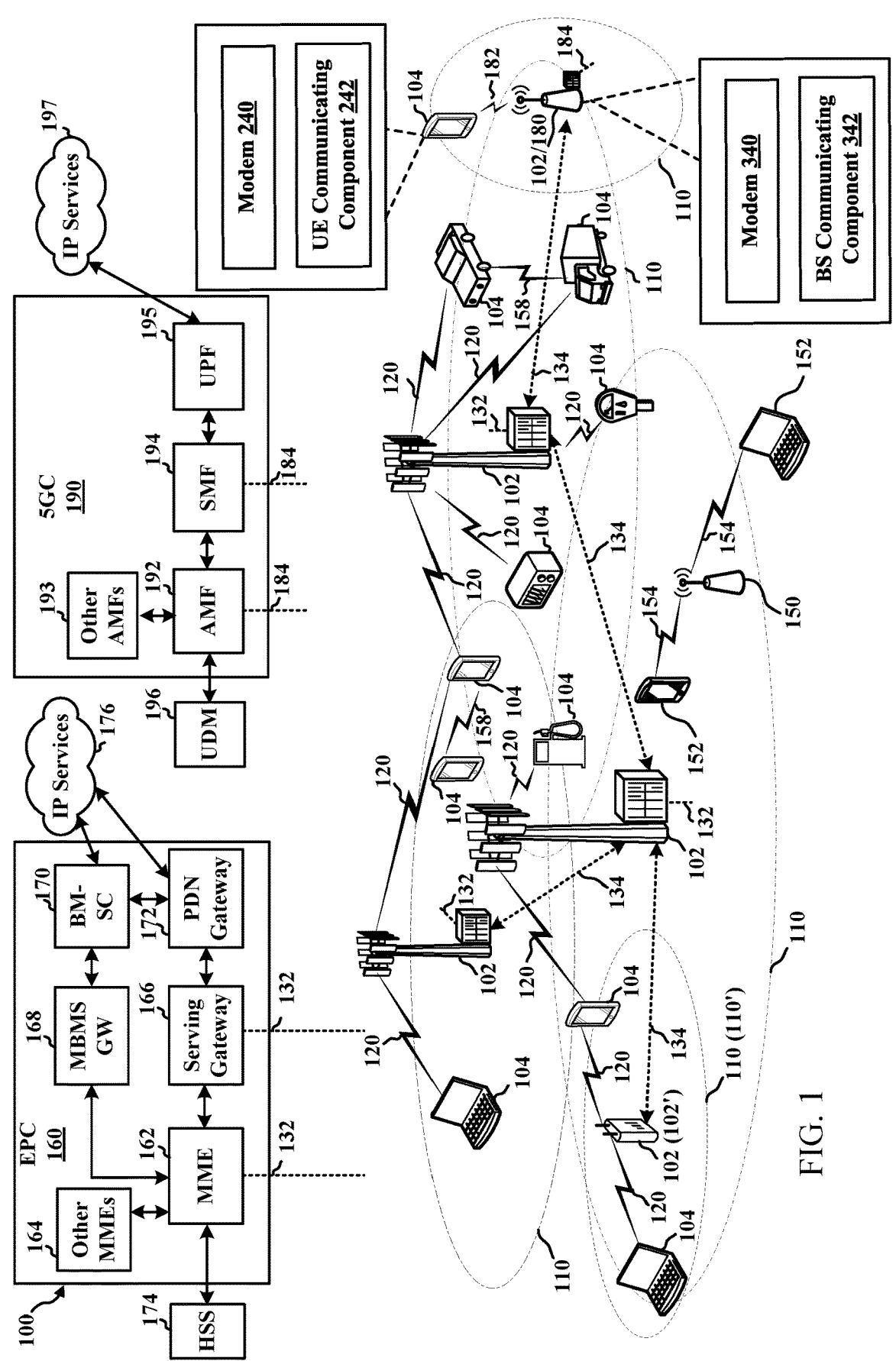
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to generating waveforms in wireless communications to improve reliability for transmitting or receiving the waveforms. In wireless communication technologies, such as fifth generation (5G) new radio (NR), different waveforms may be possible for wireless communications (e.g., for downlink, uplink, and/or sidelink operation). The waveforms may include cyclic prefix (CP)-orthogonal frequency division multiplexing (OFDM), single carrier-OFDM in a frequency division (FD) implementation, such as discrete Fourier transform (DFT)-spread (S)-OFDM, or single carrier-quadrature amplitude modulation (QAM) in time division (TD) implementation, which may each have associated advantages.

For example, CP-OFDM can be CP-based and may have higher complexity, but may provide a single tap frequency domain equalization (FDE), efficient bandwidth (BW) utilization, simplified frequency division multiplexing (FDM), increased subcarrier spacing (SCS), higher-order multiple-input multiple-output (MIMO), etc. In another example, single carrier FD implementations may use GP or guard interface (GI) and may have higher complexity, but may also provide single tap FDE, efficient BW utilization, FDM with peak-to-average-power-ratio (PAPR) impact, and increased SCS. In another example, single carrier TD implementations may use CP or GI and may have lower complexity, may provide a single tap FDE or time domain equalization (TDE), but may need guard band, may use FDM with guard bands, but may be optimal for lower signal-to-noise ratio (SNR), may use time domain filtering for lower PAPR, etc. In an example, different waveforms can be used for higher bands than for lower bands, as higher bands may have higher phase noise (PN), may benefit from lower PAPR, may possibly increase device complexity, etc.

In generating waveforms for wireless communications, for example, CP or GI can be used to avoid symbol interference between symbols of the waveform. For example, OFDM waveforms can generate a number of OFDM symbols in a slot of multiple OFDM symbols. CP or GI can be generated between each symbol, where CP can be outside of the DFT and GI can be inside of the DFT. CP can convert linear convolution of the transmit symbols with the channel to a circular convolution, which can provide a single tape FDE at the received. CP can be slot contained, can be generated with random data, but may not be easily adaptable to delay spreads. GI can maintain symbol/slot alignment, may use a known sequence of zeros or a unique word (UW), can be utilized for synchronization, channel estimation, or phase tracking, can adapt to delay spreads without changing symbol duration, etc.

For generating a UW-OFDM waveform, for example, GI can be implemented in multiple ways. In one example, the UW-OFDM waveform can use zero-tail (ZT), where zeros are appended at the end (and possibly the beginning) of the symbols. In another example, the UW-OFDM waveform can use UW (and is referred to herein as UW for ease of explanation), where some known signal/sequence is appended to the end (and possibly the beginning) of the modulation symbols. In one example, in generating a UW-OFDM waveform, a systematic approach can be used where separate data and redundant subcarriers (SCs), which are also referred to herein as tones, can exist at inverse fast Fourier transform (IFFT) input, and where redundant SCs can, on average, have higher power than data SCs. In this approach, position of the redundant SCs can be optimized to improve reliability of the waveform. In another example, in generating a UW-OFDM waveform, a non-systematic approach can be used where each SC includes a mix of data and redundancy (e.g., no differentiation of redundancy from data), where average power on all non-guard SCs can be similar. This approach can achieve reduced total energy as compared to the systematic approach, which may be better for power amplifier. In addition, in this approach, the generator matrix can be optimized to improve reliability of the waveform.

Using the systematic approach, for example, redundant SCs (r) are inserted at the IFFT input, where r is dependent on data (d) and GI (u). To improve reliability of the waveform, mapping the r SCs into the IFFT input can be performed by selecting or determining optimized locations to minimize power requirements at the IFFT. In an example, a permutation matrix (P) can be used to control possible energy increase at the IFFT output. Data samples (x) and GI samples (u) can be determined based on performing IFFT of the data SCs (d) and redundant SCs (r) having a SC mapping (B) and permutation matrix (P) applied. The operation can be represented as:

$$\begin{bmatrix} x \\ u \end{bmatrix} = F_N^{-1} BP \begin{bmatrix} d \\ r \end{bmatrix}$$

where $$F_N^{-1}$$

is IFFT of length N. If $$M = F_N^{-1} BP:$$

$$\begin{bmatrix} x \\ u \end{bmatrix} = \begin{bmatrix} M_{11} & M_{12} \\ M_{21} & M_{22} \end{bmatrix} \begin{bmatrix} d \\ r \end{bmatrix}, u = M_{21}d + M_{22}r$$

r can be estimated as $$\hat{r} = M_{22}^+(u - M_{21}d),$$

where $$M_{22}^+$$

is the pseudo-inverse of $M_{22}$. Other ways to determine $\hat{r}$ can also be used (e.g., QR factorization, singular value decomposition (SVD), etc.).

To reduce the complexity of calculating P and/or reduce the overhead of the redundant SCs, $N_r$ may be chosen to be less than $N_u$, hence $M_{22}$ may have more rows that columns and solving for r can become a least square fitting problem. In this example, the quality of the UW samples, can depend on how good the fit is (how small the error is). This may result to an undesirable power regrowth at the end of the GI, where the power regrowth at the GI end can depend on number of redundant SCs used. In addition, for example, power regrowth can be mitigated at least in part by introducing head samples to the OFDM waveform. In this example, head samples (s), data samples (x) and tail GI samples (u) can be determined based on performing IFFT of the data SCs (d) and redundant SCs (r) having a SC mapping (B) and permutation matrix (P) applied. The operation can be represented as:

$$\begin{bmatrix} s \\ x \\ u \end{bmatrix} = M \begin{bmatrix} d \\ r \end{bmatrix}, \text{where } M = F_N^{-1}BP$$

where s is the head samples of length $N_s$.

$$\begin{bmatrix} s \\ x \\ u \end{bmatrix} = \begin{bmatrix} M_{11} & M_{12} \\ M_{21} & M_{22} \\ M_{31} & M_{32} \end{bmatrix} \begin{bmatrix} d \\ r \end{bmatrix} \rightarrow \begin{bmatrix} s \\ u \end{bmatrix} = \begin{bmatrix} M_{11} & M_{12} \\ M_{31} & M_{32} \end{bmatrix} \begin{bmatrix} d \\ r \end{bmatrix}$$

In an example, $$\hat{r} = \begin{bmatrix} M_{12} \\ M_{32} \end{bmatrix}^+ \left( \begin{bmatrix} s \\ u \end{bmatrix} - \begin{bmatrix} M_{11} \\ M_{31} \end{bmatrix} d \right), \text{where } \begin{bmatrix} M_{12} \\ M_{32} \end{bmatrix}^+$$

is the pseudo-inverse of $$\begin{bmatrix} M_{12} \\ M_{32} \end{bmatrix}.$$

As such, for example, $\hat{r}$ can be a function of s, d, and u. Other ways to determine $\hat{r}$ can also be used (e.g., QR factorization, singular value decomposition (SVD), etc.), as described. In addition, in either case, P can be optimized for desirable transmit power properties and/or to achieve a power drop at the end of the transmission due to the GI.

Aspects described herein relate to including redundant subcarriers for frequency division multiplexed (FDM) communications in a UW-OFDM waveform. For example, multiple channels or users (e.g., communications for UEs) can be FDMed in the UW-OFDM waveform. In an example, time domain common head samples and/or tail samples can be produced for the FDMed communications, which may include using redundancy tones in the frequency domain in addition to data tones for the communications. A permutation matrix, P, can also be used to manage transmit power, as described. In one example, the redundancy tones can be separately generated for each user or channel, which can allow for different redundancy, and thus different signal reliability per user or channel. In another example, the redundancy tones can be generated for the data of all users or channels, which can result in using less redundancy tones overall, but the same reliability for all users or channels. Thus, in some examples, whether the use separately generated redundancy tones or the same redundancy tones for data in a waveform may depend on a use case for the data tones. For example, users experiencing similar signal quality can be grouped for using the same redundancy tones for FDMed communications. In another example, different channels for a same user can be grouped for using the same redundancy tones for FDMed communications. In some examples, higher priority channels may be separated from lower priority channels to additional redundancy tones when FDMed with the lower priority channels, etc.

In an example, using redundancy tones to create head samples and/or tail samples in a waveform can improve reliability of the waveform by creating a guard interval and/or by mitigating power regrowth at the end of the waveform, as described. In addition, using FDM can allow for transmitting communications for multiple users or channels in a single waveform, which can maximize use of communication resources. Separately or jointly using or determining redundant tones for the FDM communications can allow for balancing overhead concerns with reliability requirements for the communications. Both of these improvements can enhance the quality and/or efficiency of wireless communications between devices, which can also allow for conservation of communication resources, and/or can accordingly improve user experience when using a device (e.g., a user equipment (UE)).

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for communicating with another node using a waveform of multiplexed communications generated using one or more of redundant SCs, head samples, or tail samples, in accordance with aspects described herein. In addition, some nodes may have a modem 340 and BS communicating component 342 for communicating with another node using a waveform of multiplexed communications generated using one or more of redundant SCs, head samples, or tail samples, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can communicate with a base station 102 using a waveform that is generated with at least one of redundant SCs, head samples, or tail samples, and may include communications that are FDMed for multiple UEs and/or multiple channels for a given UE. For example, UE communicating component 242 can receive, from the base station 102, downlink signals having a waveform generated with at least one of redundant SCs, head samples, or tail samples. UE communicating component 242 can receive the waveform, generate a mapping of SCs by performing a fast Fourier transform (FFT), demap a combination (or permutation) of a set of SCs that may include at least one set of redundant SCs and data SCs, separate, from, the combination of the set of SCs, the data SCs, and process the data SCs relevant to the UE 104 to obtain data transmitted by the waveform. For example, the data SCs can include data for multiple UEs or multiple channels, and UE communicating component 242 can obtain the data SCs scheduled for UE 104 or the corresponding channel. The at least one redundant set of SCs can include one set of redundant SCs for all data SCs, or can include a set of redundant SCs for each set of data SCs.

In an example, BS communicating component 342 can transmit, to the UE 104, downlink signals having a waveform generated with at least one of redundant SCs, head samples, or tail samples. BS communicating component 342 can generate the waveform at least in part by including at least one set of redundant SCs with data SCs, which may include interleaving, based on a permutation matrix, the set of redundant SCs with the set of data SCs, mapping the set of redundant SCs as input to a IFFT, and generate the waveform based on an output from the IFFT, which may include head samples or tail samples resulting from the at least one set of redundant SCs.

Though generally shown and described as the base station 102 generating and transmitting the waveform and the UE 104 receiving and processing the waveform, aspects described herein can be used at substantially any nodes of the wireless network. In one example, the UE communicating component 242 can additionally or alternatively include the components and functionality described for the BS communicating component 342 to generate waveforms for transmitting (e.g., to the base station on uplink, to another UE on sidelink, etc.). In another example, the BS communicating component 342 can additionally or alternatively include the components and functionality described for the UE communicating component 242 to receive and processing waveforms received from a UE 104 on uplink.

Figure 2:
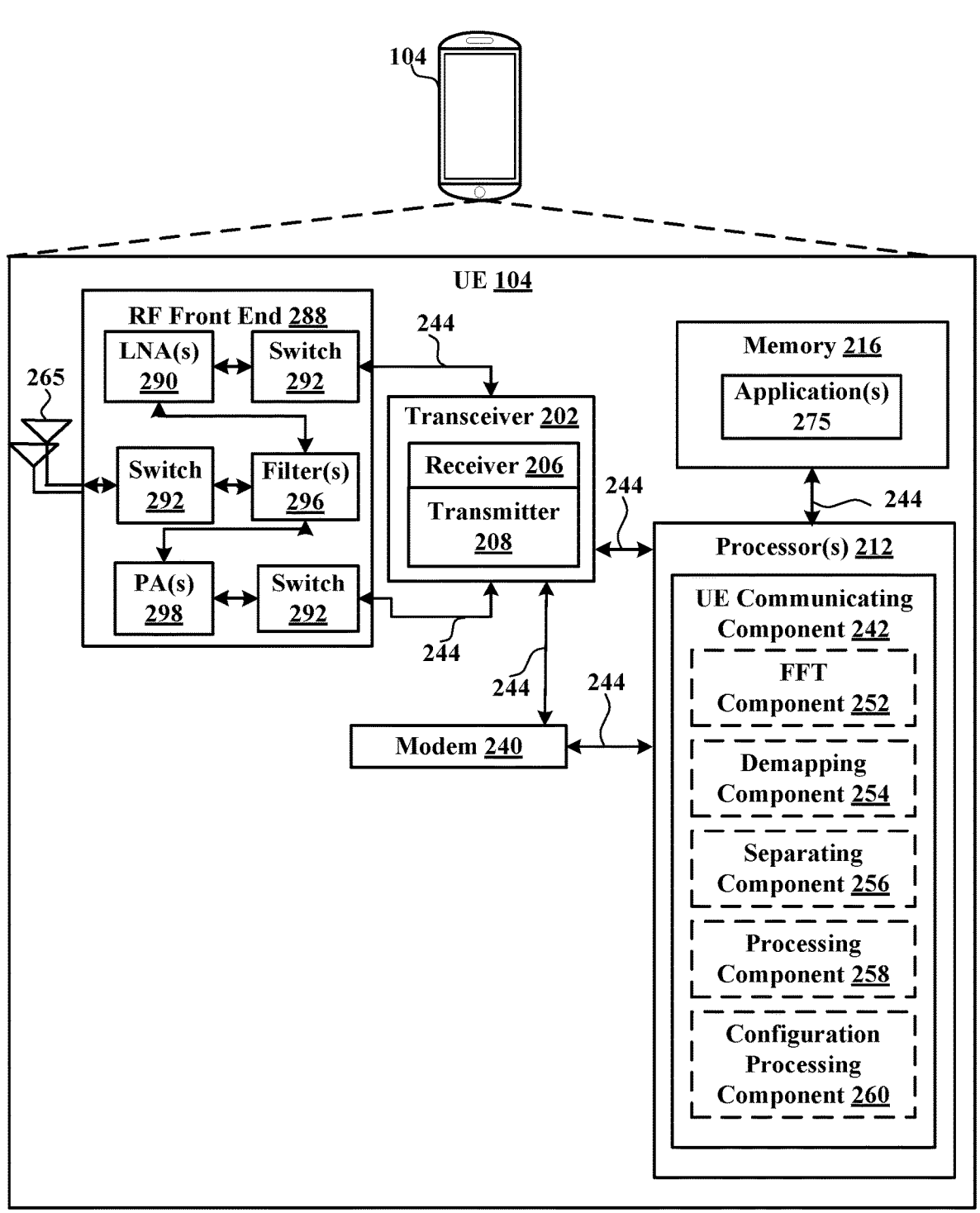
FIG. 2 is a block diagram illustrating an example of a user equipment (UE), in accordance with various aspects of the present disclosure.
Figure 3:
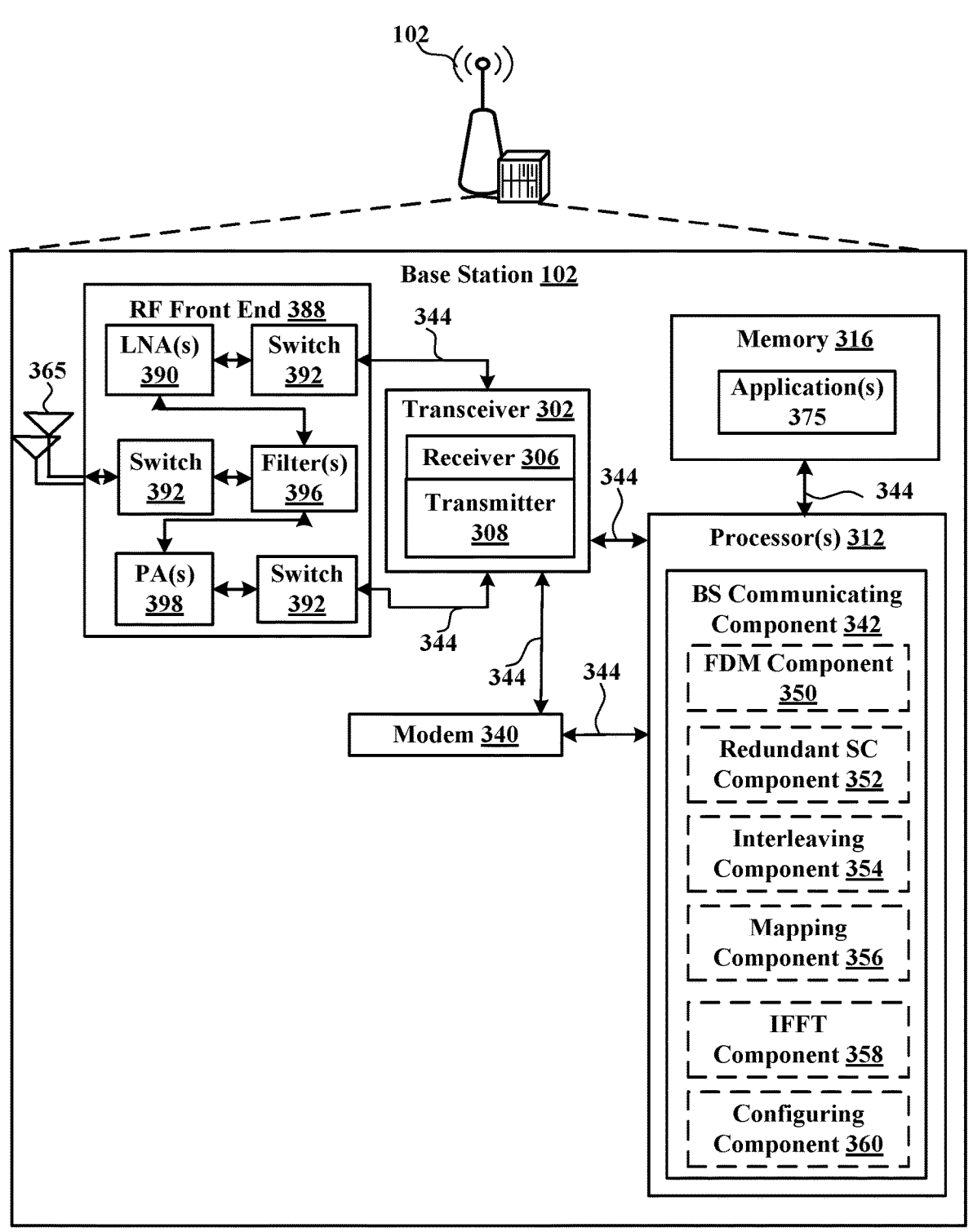
FIG. 3 is a block diagram illustrating an example of a base station, in accordance with various aspects of the present disclosure.
Figure 4:
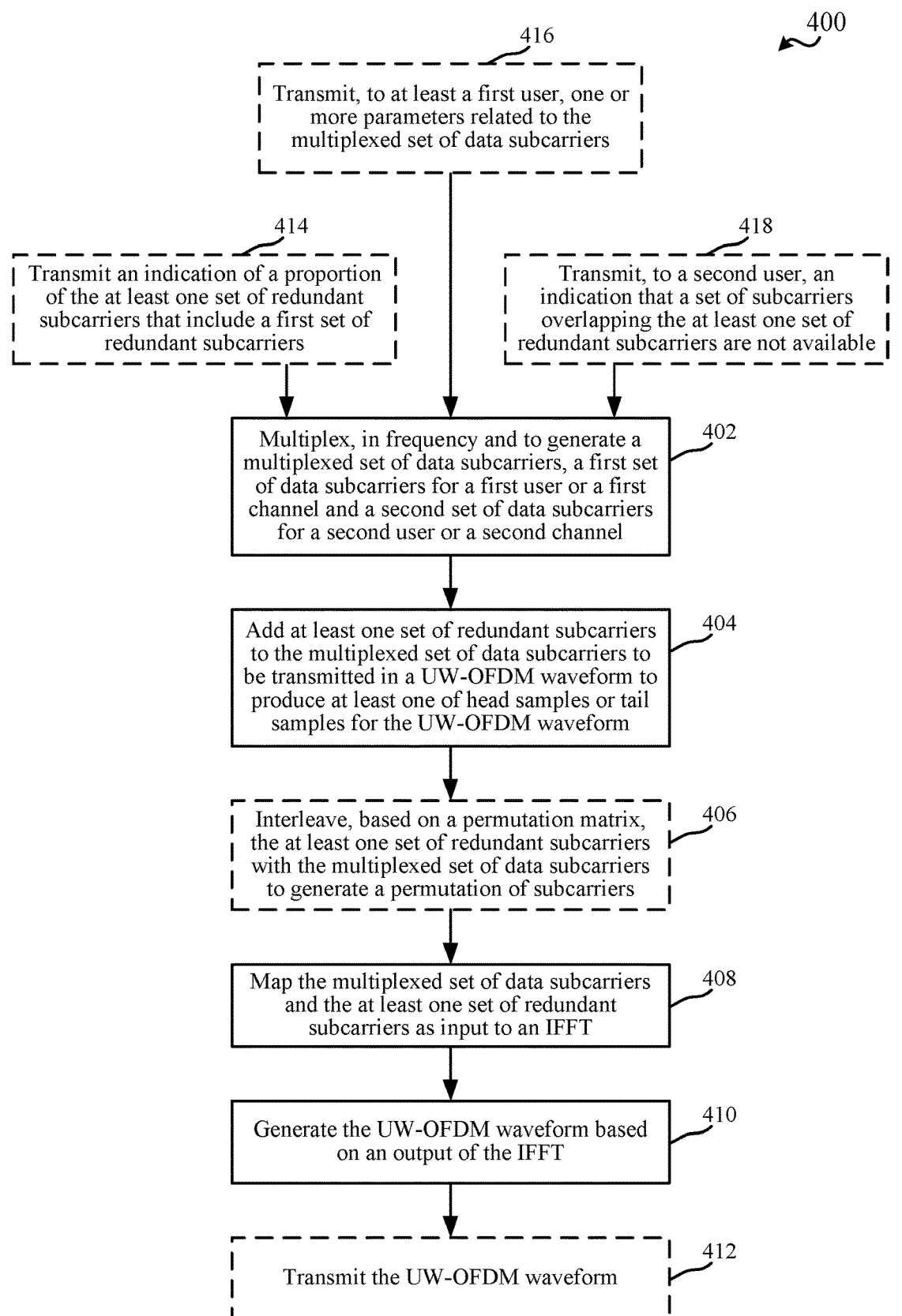
FIG. 4 is a flow chart illustrating an example of a method for generating a waveform of frequency division multiplexed (FDMed) communications with redundant subcarriers, in accordance with aspects described herein.

Turning now to FIGS. 2-9, aspects are depicted with reference to one or more components and one or more methods that may perform the actions or operations described herein, where aspects in dashed line may be optional. Although the operations described below in FIGS. 4 and 8 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for communicating with another node using a waveform having FDMed communications and generated using a set of redundant SCs, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a FFT component 252 for performing an FFT of a waveform to generate a set of SCs, a demapping component 254 for demapping a permutation of a set of redundant SCs and data SCs from the set of SCs, a separating component 256 for separating, based on a permutation matrix, the set of redundant SCs and the set of data SCs from the permutation, a processing component 258 for processing the data SCs to obtain data transmitted by the waveform, and/or a configuration processing component 260 for processing one or more configurations for obtaining parameters or instructions for performing the demapping, separating, processing, etc., in accordance with aspects described herein.

In an aspect, the processor(s) 212 may correspond to one or more of the processors described in connection with the UE in FIG. 9. Similarly, the memory 216 may correspond to the memory described in connection with the UE in FIG. 9.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for communicating with another node using a waveform having FDMed communications and generated using one or more of redundant SCs, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a FDM component 350 for multiplexing data for multiple channels and/or users in frequency, a redundant SC component 352 for adding redundant SCs to a set of data SCs, an interleaving component 354 for interleaving the redundant SCs and the set of data SCs based on a permutation matrix, a mapping component 356 for mapping the permutation of SCs as input to a IFFT, and IFFT component 358 for performing an IFFT of the permutation of SCs, and/or a configuring component 360 for configuring one or more parameters or instructions for processing the waveform, in accordance with aspects described herein.

In an aspect, the processor(s) 312 may correspond to one or more of the processors described in connection with the base station in FIG. 9. Similarly, the memory 316 may correspond to the memory described in connection with the base station in FIG. 9.

FIG. 4 illustrates a flow chart of an example of a method 400 for generating a waveform of FDMed communications with redundant subcarriers, in accordance with aspects described herein. In an example, a base station 102 can perform the functions described in method 400 using one or more of the components described in FIGS. 1 and 3. In another example, a UE 104 can include the one or more components described of the base station 102 in FIGS. 1 and 3 to generate the waveform.

In method 400, at Block 402, a first set of data subcarriers for a first user or a first channel and a second set of subcarriers for a second user or a second channel can be multiplexed in frequency and to generate a multiplexed set of data subcarriers. In an aspect, FDM component 350, e.g., in conjunction with processor(s) 312, memory 316, transceiver 302, BS communicating component 342, etc., can multiplex, in frequency and to generate a multiplexed set of data subcarriers, the first set of data subcarriers for the first user or the first channel and the second set of data subcarriers for the second user or the second channel. In one example, FDM component 350 can append the second set of data subcarriers as subcarriers following the first set of data subcarriers, or otherwise using adjacent sets of subcarriers, that are adjacent in frequency, for multiplexing the first and second sets of data subcarriers. Though a first and second set of data subcarriers are described, FDM component 350 may similarly multiplex additional sets of data subcarriers for transmission in the waveform. In addition, in one example, as described further herein, a set of redundant subcarriers can be generated for each set of data subcarriers. In this example, the redundant subcarriers and data subcarriers may be multiplexed for transmission in the waveform such that a first set of combined subcarriers including the first set of data subcarriers and corresponding redundant subcarriers can be multiplexed with a set of combined subcarriers including the second set of data subcarriers and corresponding redundant subcarriers, etc.

In method 400, at Block 404, at least one set of redundant subcarriers can be added to the multiplexed set of data subcarriers to be transmitted in a UW-OFDM waveform to produce at least one of head samples or tail samples for the UW-OFDM waveform. In an aspect, redundant SC component 352, e.g., in conjunction with processor(s) 312, memory 316, transceiver 302, BS communicating component 342, etc., can add at least one set of redundant subcarriers to the multiplexed set of data subcarriers to be transmitted in the UW-OFDM waveform to produce at least one of head samples or tail samples for the UW-OFDM waveform. For example, the head samples and/or tail samples can be added to the UW-OFDM waveform to provide additional separation between symbols. In one example, redundant SC component 352 can add redundant SCs for head and tail samples. Moreover, for example, redundant SC component 352 can add one set of redundant SCs that are for (e.g., a function of) all of the data subcarriers. In another example, redundant SC component 352 can add a set of redundant SCs for each set of data subcarriers in the multiplexed set of data subcarriers. Examples are shown in FIGS. 5-7.

Figure 5:
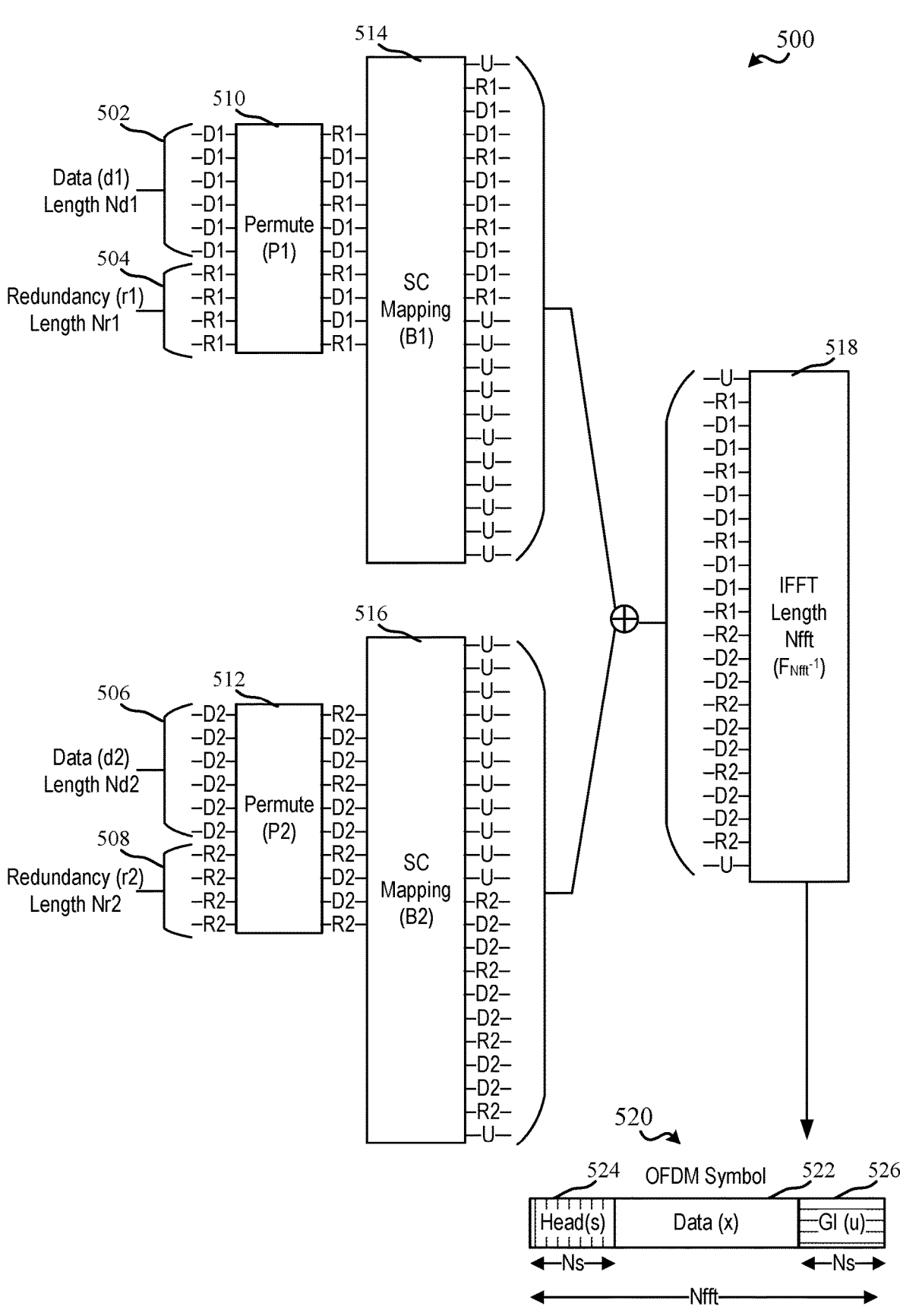
FIG. 5 illustrates an example of a waveform generation process where data subcarriers and associated redundant subcarriers can be multiplexed in a frequency domain for separate permutation and subcarrier mapping, in accordance with aspects described herein.

FIG. 5 illustrates an example of a waveform generation process 500 where data subcarriers and associated redundant subcarriers can be multiplexed in a frequency domain for separate permutation and SC mapping. In waveform generation process 500, redundant tones 504 corresponding to a first set of data tones 502 can be added to the first set of data tones 502 for subsequent permutation of the tones, and separately, redundant tones 514 corresponding to a second set of data tones 512 can be added to the second set of data tones 512 for subsequent permutation of the tones, as described further herein.

Figure 6:
FIG. 6 is a flow chart illustrating an example of a waveform generation process where data subcarriers and associated redundant subcarriers can be multiplexed in a frequency domain, in accordance with aspects described herein.

FIG. 6 illustrates an example of a waveform generation process 600 where data subcarriers and associated redundant subcarriers can be multiplexed in a frequency domain. In waveform generation process 600, redundant tones 604 corresponding to a first set of data tones 602 can be added to the first set of data tones 602, and separately, redundant tones 608 corresponding to a second set of data tones 606 can be added to the second set of data tones 606 for subsequent permutation of the tones, for subsequent permutation of the tones, as described further herein.

FIG. 7 illustrates an example of a waveform generation process 700 where data subcarriers can be multiplexed in a frequency domain along with a set of redundant subcarriers. In waveform generation process 700, redundant tones 706 corresponding to a first set of data tones 702 and a second set of data tones 704 can be added to the multiplexed first set of data tones 702 and second set of data tones 704, for subsequent permutation of the tones, as described further herein.

As described, for example, redundant SC component 352 can generate the redundant SCs to add to each set of data subcarriers or for all of the data subcarriers based on the formulas described above to achieve adding head or tail samples to the waveform. For example, as described, redundant SC component 352 can determine or generate r̂ as a function of s, d, and u, where d can be a given set of data subcarriers in the multiplexed set of data subcarriers (and redundant SC component 352 can separately determine multiple r̂ with one being for each set of data subcarriers), or where d can be the multiplexed set of data subcarriers (and redundant SC component 352 can separately determine one r̂ for the multiplexed set of data subcarriers).

In method 400, optionally at Block 406, the at least one set of redundant subcarriers can be interleaved, based on a permutation matrix, with the multiplexed set of data subcarriers to generate a permutation of subcarriers. In an aspect, interleaving component 354, e.g., in conjunction with processor(s) 312, memory 316, transceiver 302, BS communicating component 342, etc., can interleave, based on a permutation matrix, the at least one set of redundant subcarriers with the multiplexed set of data subcarriers to generate the permutation of subcarriers. For example, interleaving component 354 can determine the permutation matrix that can be used to add desired head samples and/or tail samples, as described above. This may be based on, or using, the formulas described above, in one example. In addition, as described, where a set of redundant subcarriers exist for each set of data subcarriers in the multiplexed set of data subcarriers, interleaving component 354 can separately interleave one set of redundant subcarriers with its corresponding set of data subcarriers. In an example, this can be performed as a separate process (based on a separate permutation matrix) than interleaving another set of redundant subcarriers with its corresponding set of data subcarriers. In another example, this can be performed as the same process (based on the same permutation matrix) as interleaving another set of redundant subcarriers with its corresponding set of data subcarriers. In yet another example, where the at least one set of redundant subcarriers is for all of the multiplexed set of data subcarriers, interleaving component 354 can interleave the at least one set of redundant subcarriers with all of the multiplexed set of data subcarriers.

Referring again to FIG. 5, in an example, interleaving component 354 can permute the data subcarriers 502 and redundant subcarriers 504 using a permutation matrix at 510 to create a first permutation of subcarriers. In addition, for example, interleaving component 354 can separately permute the data subcarriers 506 and redundant subcarriers 508 using a permutation matrix at 512 to create a second permutation of subcarriers. Referring again to FIG. 6, in an example, interleaving component 354 can permute the data subcarriers 602 and redundant subcarriers 604, and the data subcarriers 606 and redundant subcarriers 608, using a permutation matrix at 610 to create a permutation of subcarriers. Referring again to FIG. 7, in yet another example, interleaving component 354 can permute the data subcarriers 702, data subcarriers 704, and redundant subcarriers 706 using a permutation matrix at 708 to create a permutation of subcarriers. In one example, the permutation matrix can facilitate interleaving of the redundant subcarriers within the data subcarriers, which may be according to a pattern. Defining, via the permutation matrix, the placement of the redundant subcarriers within the permutation of subcarriers can impact the reliability of the waveform by resulting in addition of head or tail samples to the waveform.

In method 400, at Block 408, the multiplexed set of data subcarriers and the at least one set of redundant subcarriers can be mapped as input to an IFFT. In an aspect, mapping component 356, e.g., in conjunction with processor(s) 312, memory 316, transceiver 302, BS communicating component 342, etc., can map the multiplexed set of data subcarriers and the at least one set of redundant subcarriers as input to the IFFT. In one example, where the at least one set of redundant subcarriers and the multiplexed set of data subcarriers are interleaved based on one or more permutation matrices to generate one or more permutations of subcarriers, as described in some examples above, mapping component 356 can map the one or more permutations of subcarriers as input to the IFFT. For example, the one or more permutations can include a single permutation of the multiplexed set of data subcarriers along with redundant subcarriers, or multiple permutations of multiple sets of data subcarriers with corresponding redundant subcarriers.

In an example, mapping component 356 can map the one or more permutations of subcarriers over a set of available frequency domain subcarriers assigned to, or otherwise designated for, the waveform, which can include a set of available subcarriers assigned for one or more UEs, one or more channels, etc. over which the waveform is transmitted (e.g., PDCCH(s), PDSCH(s), etc.). In addition, for example, mapping component 356 can map the one or more permutations of subcarriers over the set of available subcarriers along with one or more sets of guard subcarriers as input to the IFFT, where the one or more sets of guard subcarriers may include a first set of guard subcarriers before the permutation of subcarriers and/or a second set of guard subcarriers following the permutation of subcarriers (in a frequency domain).

Referring again to FIG. 5, in an example, mapping component 356 can perform SC mapping at 514 to map a first set of guard subcarriers, designated "U," followed by the first permutation of subcarriers from permutation at 510, followed by a second set of guard subcarriers, designated "U," in frequency. The second set of guard subcarriers may allow for (e.g., may be sufficient in size or number for) mapping additional permutations of subcarriers, as shown. For example, mapping component 356 can separately perform SC mapping at 516 to map a first set of guard subcarriers, designated "U," which can be sufficient for allowing mapping of another permutation of subcarriers, followed by the second permutation of subcarriers from permutation at 512, followed by a second set of guard subcarriers, designated "U," in frequency. The result of the two subcarrier mappings at 514 and 516 can be combined as input to the IFFT 518. The input to the IFFT 518 can accordingly include the first permutation of subcarriers and the second permutation of subcarriers, and/or one or more guard subcarriers at the beginning and end of the combination of subcarriers.

Referring again to FIG. 6, in an example, mapping component 356 can perform SC mapping at 612 to map a first set of guard subcarriers, designated "U," followed by the permutation of subcarriers from permutation at 610, followed by a second set of guard subcarriers, designated "U," in frequency. The output of the subcarrier mapping 612 can be provided as input to IFFT 614.

Referring again to FIG. 7, in an example, mapping component 356 can perform SC mapping at 710 to map a first set of guard subcarriers, designated "U," followed by the permutation of subcarriers from permutation at 708, followed by a second set of guard subcarriers, designated "U," in frequency. The output of the subcarrier mapping 710 can be provided as input to IFFT 712.

In method 400, at Block 410, the UW-OFDM waveform can be generated based on an output of the IFFT. In an aspect, IFFT component 358, e.g., in conjunction with processor(s) 312, memory 316, transceiver 302, BS communicating component 342, etc., can perform the IFFT and generate the UW-OFDM waveform based on the output of the IFFT. The UW-OFDM waveform, as described, can include, based on the redundant subcarriers, head samples, data samples, and tail samples. For example, IFFT component 358 can generate the head samples and/or tail samples to be zeros or to be based on some sequence (a unique word), as described.

Referring again to FIG. 5, in an example, the output of IFFT 518 can include the UW-OFDM waveform 520 including head samples 524, data samples 522, and tail samples 526.

Referring again to FIG. 6, in an example, the output of IFFT 614 can include the UW-OFDM waveform 616 including head samples 620, data samples 618, and tail samples 622.

Referring again to FIG. 7, in an example, the output of IFFT 812 can include the UW-OFDM waveform 714 including head samples 718, data samples 716, and tail samples 720.

In method 400, at Block 412, the UW-OFDM waveform can be transmitted. In an aspect, BS communicating component 342, e.g., in conjunction with processor(s) 312, memory 316, transceiver 302, etc., can transmit the UW-OFDM waveform (e.g., to a UE 104 or other devices using wireless communication). Transmitting the UW-OFDM waveform with the head samples, in an example, can effectively shift the power emitted by the waveform for transmission to remove power regrowth at the end of the waveform that may result where no head samples of zero or unique word are used (e.g., where only tail samples of zero or unique word are used).

In method 400, optionally at Block 414, an indication of a proportion of the at least one set of redundant subcarriers that include a first set of redundant subcarriers can be transmitted. In an aspect, configuring component 360, e.g., in conjunction with processor(s) 312, memory 316, transceiver 302, BS communicating component 342, etc., can transmit (e.g., to a UE 104 or other device receiving the UW-OFDM waveform) the indication of the proportion of the at least one set of redundant subcarriers that include the first set of redundant subcarriers. In an example, configuring component 360 can transmit the indication where multiple sets of redundant subcarriers are used in generating the UE-OFDM waveform (e.g., one set of redundant subcarriers for each set of data subcarriers in the multiplexed set of data subcarriers). Referring to FIG. 5, for example, the indication may indicate a proportion of redundant subcarriers 504 for the data subcarriers 502, where the proportion is the proportion of all redundant subcarriers that include redundant subcarriers 504 (e.g., the proportion of all redundant subcarriers that include redundant subcarriers 504 and redundant subcarriers 508). For example, configuring component 360 can transmit the indication using semi-static signaling (e.g., radio resource control (RRC) signaling), or dynamic signaling (e.g., using media access control (MAC)-control element (CE), downlink control information (DCI), etc.). This can allow the UE 104 or other receiving device to determine a number of redundant subcarriers used for a given set of data subcarriers based on the indicated proportion.

In an example, indicating the proportion of redundant subcarriers may be beneficial where redundant tones are generated for each user/channel separately as a function of its corresponding data (e.g., redundant tones $r1=f(d1)$, $r2=f(d2)$, . . . ). In some examples described above, in separately generating redundant tones, interleaving component 354 may use the same or different permutation matrix or permutation process for different sets of data subcarriers. In some examples described above, in separately mapping redundant tones, mapping component 356 may use the same or different SC mapping for different permutations of subcarriers. Specific examples are shown and described in FIGS. 5 and 6 above.

In a specific example, and as described in reference to FIG. 5 above, an example of a model using separate permutation matrix or process (e.g., at 510, 512) and separate SC mapping (e.g., at 514, 516) can include the following, which is described for two users/channels, but can be easily extended to additional users/channels. Let s be the TD header samples, u be the TD tail samples, and x be the TD data samples:

$$\begin{bmatrix} s \\ x \\ u \end{bmatrix} = F_{Nfft}^{-1}\left(B_1 P_1 \begin{bmatrix} d_1 \\ r_1 \end{bmatrix} + B_2 P_2 \begin{bmatrix} d_2 \\ r_2 \end{bmatrix}\right).$$

$$\text{Let } M = F_{Nfft}^{-1}B_1 P_1 = \begin{bmatrix} M_{11} & M_{12} \\ M_{21} & M_{22} \\ M_{31} & M_{32} \end{bmatrix} \text{ and}$$

$$L = F_{Nfft}^{-1}B_2 P_2 = \begin{bmatrix} L_{11} & L_{12} \\ L_{21} & L_{22} \\ L_{31} & L_{32} \end{bmatrix}.$$

$$F_{Nfft}^{-1}$$

is IDFT matrix of size Nfft, $B_i$, $P_i$, $d_i$, $r_i$ is SC mapping, permutation matrix, data, and redundancy, respectively, for user/channel i. After algebraic manipulation:

$$\begin{bmatrix} s \\ u \end{bmatrix} = \begin{bmatrix} M_{11} \\ M_{31} \end{bmatrix} d_1 + \begin{bmatrix} M_{12} \\ M_{32} \end{bmatrix} r_1 + \begin{bmatrix} L_{11} \\ L_{31} \end{bmatrix} d_2 + \begin{bmatrix} L_{12} \\ L_{32} \end{bmatrix} r_2.$$

Splitting it into ($\alpha_1 + \alpha_2 = 1$):

$$\alpha_1 \begin{bmatrix} s \\ u \end{bmatrix} = \begin{bmatrix} M_{11} \\ M_{31} \end{bmatrix} d_1 + \begin{bmatrix} M_{12} \\ M_{32} \end{bmatrix} r_1 \text{ and } \alpha_2 \begin{bmatrix} s \\ u \end{bmatrix} = \begin{bmatrix} L_{11} \\ L_{31} \end{bmatrix} d_2 + \begin{bmatrix} L_{12} \\ L_{32} \end{bmatrix} r_2.$$

Solving these linear equations for $r_1$ and $r_2$, for example:

$$\hat{r_1} = \begin{bmatrix} M_{12} \\ M_{32} \end{bmatrix}^+ \left(\alpha_1 \begin{bmatrix} s \\ u \end{bmatrix} - \begin{bmatrix} M_{11} \\ M_{31} \end{bmatrix} d_1\right) \text{ and}$$

$$\hat{r_2} = \begin{bmatrix} L_{12} \\ L_{32} \end{bmatrix}^+ \left(\alpha_2 \begin{bmatrix} s \\ u \end{bmatrix} - \begin{bmatrix} L_{11} \\ L_{31} \end{bmatrix} d_2\right).$$

where $(\bullet)^+$ is the pseudo-inverse. Other possible approaches include QR decomposition and singular value decomposition (SVD). Similar derivation can be made for separate P and same B (e.g., $B_1 = B_2$). In examples described above, configuring component 360 can transmit an indication of the proportion $\alpha_1$ for the i-th user/channel.

In another specific example, and as described in reference to FIG. 6 above, an example of a model using a same permutation matrix or process (e.g., at 610) and a same SC mapping (e.g., at 612) for different sets of data subcarriers and redundant subcarriers can include the following, which is described for two users/channels, but can be easily extended to additional users/channels. Let s be the TD header samples, u be the TD tail samples, and x be the TD data samples:

$$\begin{bmatrix} s \\ x \\ u \end{bmatrix} = F_{Nfft}^{-1}BP \begin{bmatrix} d_1 \\ r_1 \\ d_2 \\ r_2 \end{bmatrix}.$$

$$\text{Let } M = F_{Nfft}^{-1}BP = \begin{bmatrix} M_{11} & M_{12} & M_{13} & M_{14} \\ M_{21} & M_{22} & M_{23} & M_{24} \\ M_{31} & M_{32} & M_{33} & M_{34} \end{bmatrix}$$

After algebraic manipulation:

$$\begin{bmatrix} s \\ u \end{bmatrix} = \begin{bmatrix} M_{11} \\ M_{31} \end{bmatrix} d_1 + \begin{bmatrix} M_{12} \\ M_{32} \end{bmatrix} r_1 + \begin{bmatrix} M_{13} \\ M_{33} \end{bmatrix} d_2 + \begin{bmatrix} M_{14} \\ M_{34} \end{bmatrix} r_2,$$

which can be split it into ($\alpha_1 + \alpha_2 = 1$):

$$\alpha_1 \begin{bmatrix} s \\ u \end{bmatrix} = \begin{bmatrix} M_{11} \\ M_{31} \end{bmatrix} d_1 + \begin{bmatrix} M_{12} \\ M_{32} \end{bmatrix} r_1 \text{ and } \alpha_2 \begin{bmatrix} s \\ u \end{bmatrix} = \begin{bmatrix} M_{13} \\ M_{33} \end{bmatrix} d_2 + \begin{bmatrix} M_{14} \\ M_{34} \end{bmatrix} r_2.$$

Solving these linear equations for $r_1$ and $r_2$, for example:

$$\hat{r_1} = \begin{bmatrix} M_{12} \\ M_{32} \end{bmatrix}^+ \left(\alpha_1 \begin{bmatrix} s \\ u \end{bmatrix} - \begin{bmatrix} M_{11} \\ M_{31} \end{bmatrix} d_1\right) \text{ and}$$

$$\hat{r_2} = \begin{bmatrix} M_{14} \\ M_{34} \end{bmatrix}^+ \left(\alpha_2 \begin{bmatrix} s \\ u \end{bmatrix} - \begin{bmatrix} M_{13} \\ M_{33} \end{bmatrix} d_2\right).$$

where $(\bullet)^+$ is the pseudo-inverse. Other possible approaches include QR decomposition and SVD. In examples described above, configuring component 360 can transmit an indication of the proportion $\alpha_1$ for the i-th user/channel.

In yet another example, where redundant SC component 352 determines redundant SCs for all of the multiplexed set of data subcarriers (e.g., generated for all users as a function of all users/channels' data—for example, $r=f(d1, d2, . . . )$, an example of a model can include the following, which is described for two users/channels, but can be easily extended to additional users/channels. Let s be the TD header samples, u be the TD tail samples, and x be the TD data samples:

$$\begin{bmatrix} s \\ x \\ u \end{bmatrix} = F_{Nfft}^{-1}BP \begin{bmatrix} d_1 \\ d_2 \\ r \end{bmatrix}.$$

$$\text{Let } M = F_{Nfft}^{-1}BP = \begin{bmatrix} M_{11} & M_{12} \\ M_{21} & M_{22} \\ M_{31} & M_{32} \end{bmatrix} \text{ and } d = \begin{bmatrix} d_1 \\ d_2 \end{bmatrix}.$$

After algebraic manipulation:

$$\begin{bmatrix} s \\ u \end{bmatrix} = \begin{bmatrix} M_{11} \\ M_{31} \end{bmatrix} d + \begin{bmatrix} M_{12} \\ M_{32} \end{bmatrix} r.$$

Solving these linear equations for r, for example:

$$\hat{r} = \begin{bmatrix} M_{12} \\ M_{32} \end{bmatrix}^{+} \left( \begin{bmatrix} s \\ u \end{bmatrix} - \begin{bmatrix} M_{11} \\ M_{31} \end{bmatrix} d \right),$$

Where $(\bullet)^{+}$ is the pseudo-inverse. Other possible approaches include QR decomposition and SVD, as described.

In method 400, optionally at Block 416, one or more parameters related to the multiplexed set of data subcarriers can be transmitted to at least a first user. In an aspect, configuring component 360, e.g., in conjunction with processor(s) 312, memory 316, transceiver 302, BS communicating component 342, etc., can transmit, to at least the first user (e.g., to a UE 104 or other device receiving the UW-OFDM waveform), the one or more parameters related to the multiplexed set of data subcarriers. For example, configuring component 360 can transmit the one or more parameters in RRC signaling, MAC-CE, DCI, etc. In an example, the one or more parameters may indicate whether the same or different permutation matrix or process is used to interleave different sets of subcarriers with corresponding redundant subcarriers, whether the same or different SC mapping is used to map the subcarriers as input to an IFFT, etc. In any case, for example, the one or more parameters may indicate methods and/or parameters used to generate the multiplex the users/channels. Thus, in some examples, the methods and/or parameters can be specified, can be signaled (e.g., from the base station 102 to one or more UEs), etc. In other examples, the methods and/or parameters can be implicitly derived by the base station 102 (or UE(s) 104) based on certain conditions, such as channel quality for the multiple users/channels, distance between the users (or distance or pathloss from the users to the base station 102), etc.

In one example, mapping component 356 can map the redundant SCs for at least a first set of data subcarriers to be within (e.g., confined within) an allocation of resources for the corresponding user/channel in frequency. For example, BS communicating component 342 can have scheduled the allocation of resources for transmitting the UW-OFDM waveform including the user/channel (e.g., PDCCH or PDSCH resources for a given user or channel). In another example, mapping component 356 can map the redundant SCs for at least the first set of data subcarriers to span a bandwidth larger than the allocation of resources for the corresponding user/channel in frequency. In yet another example, mapping component 356 can map the redundant SCs for at least a first set of data subcarriers to use subcarriers of other users/channels in frequency. In this example, to avoid overlap of resources, a user/channel specific redundant SC shift can be used in the frequency domain. In one example, configuring component 360 can indicate to the UE or other receiving device the one or more parameters to indicate the mapping of the redundant SCs and/or whether the redundant SCs are within the allocation of resources, larger than the allocation of resources, using SCs for other users/channels, etc.

In an example, such as where subcarriers of other users (e.g., a second user) are used for mapping the set of redundant SCs for a first set of data subcarriers for a first user, in method 400, optionally at Block 418, an indication that a set of subcarriers overlapping the at least one set of redundant subcarriers are not available can be transmitted to a second user. In an aspect, configuring component 360, e.g., in conjunction with processor(s) 312, memory 316, transceiver 302, BS communicating component 342, etc., can transmit, to the second user (e.g., to a second UE or other device that may receive the UW-OFDM waveform), the indication that the set of subcarriers overlapping the at least one set of redundant subcarriers (which may be used for communications to a first user) are not available. For example, configuring component 360 can transmit the indication to the second user using RRC signaling, MAC-CE, DCI, etc. This can inform the second user so the second user can process communications from the base station 102 (e.g., as part of the UW-OFDM waveform or another waveform) without using (or by rate matching around) the indicated subcarriers. In another example, configuring component 360 may not indicate the overlapping subcarriers, and the second user can process communications from the base station 102 with some performance loss.

FIG. 8 illustrates a flow chart of an example of a method 800 for processing a waveform of FDMed communications with redundant subcarriers, in accordance with aspects described herein. In an example, a UE 104 can perform the functions described in method 800 using one or more of the components described in FIGS. 1 and 2. In another example, a base station 102 can include the one or more components described of the UE 104 in FIGS. 1 and 2 to process the waveform.

In method 800, at Block 802, a UW-OFDM waveform having head samples or tail samples corresponding to at least one set of redundant subcarriers can be received. In an aspect, UE communicating component 242, e.g., in conjunction with processor(s) 212, memory 216, transceiver 202, etc., can receive the UW-OFDM waveform (e.g., from a base station 102 or other UE 104) having head samples or tail samples corresponding to at least one set of redundant subcarriers. For example, UE communicating component 242 can receive the UW-OFDM waveform in time and frequency resources that are scheduled for receiving communications, and the UW-OFDM waveform may include multiplexed data subcarriers for multiple users and/or channels.

In method 800, at Block 804, a mapping of subcarriers can be generated by performing FFT of the UW-OFDM waveform. In an aspect, FFT component 252, e.g., in conjunction with processor(s) 212, memory 216, transceiver 202, UE communicating component 242, etc., can generate the mapping of subcarriers by performing FFT of the UW-OFDM waveform. For example, the mapping of subcarriers can relate to subcarriers in a frequency domain over which signal energy is received by the UW-OFDM waveform. In addition, the mapping of subcarriers can include one or more permutations of subcarriers, that can correspond to a multiplexed set of data subcarriers, as described.

In method 800, at Block 806, the at least one set of redundant subcarriers and a multiplexed set of data subcarriers can be demapped from the mapping of subcarriers. In an aspect, demapping component 254, e.g., in conjunction with processor(s) 212, memory 216, transceiver 202, UE communicating component 242, etc., can demap the at least one set of redundant subcarriers and the multiplexed set of data subcarriers from other subcarriers in the UW-OFDM waveform, which may include one or more sets of guard subcarriers, as described above. In an example, demapping component 254 can receive (e.g., from the base station 102 or other device transmitting the UW-OFDM waveform) and indication of how to demap the subcarriers. For example, demapping component 254 can receive an indication of one or more SC mapping matrices, B, used by the base station 102 to map the SCs. For example, referring to FIGS. 5-7, demapping component can demap the subcarriers based on an indication of SC mapping at 514, 516, 612, 710, etc.

In method 800, optionally at Block 808, the at least one set of redundant subcarriers can be separated from the multiplexed set of data subcarriers based on a permutation matrix. In an aspect, separating component 256, e.g., in conjunction with processor(s) 212, memory 216, transceiver 202, UE communicating component 242, etc., can separate, based on the permutation matrix, the at least one set of redundant subcarriers from the multiplexed set of data subcarriers. For example, the permutation matrix can be the same as (or an inverse of or otherwise generated from) the permutation used in generating the UW-OFDM waveform (e.g., by the interleaving component 354 of the transmitting node). Thus, in one example, separating component 256 can receive, from the base station 102 or other device transmitting the UW-OFDM waveform, an indication of the permutation matrix, P, used to arrange the permutation of the at least one set of redundant subcarriers and the multiplexed set of data subcarriers. For example, based on the variations described herein, interleaving component 354 can receive an indication of one of multiple permutation matrices that correspond to the given set of data subcarriers (e.g., permutation matrix used at 510 for a first set of data subcarriers 502 or permutation matrix used at 512 for a second set of data subcarriers 506, permutation matrix used at 610 for both data subcarriers 602 and data subcarriers 606, permutation matrix used at 708 for both data subcarriers 702 and data subcarriers 704, etc.). In any case, with the data subcarriers and the redundant subcarriers separate, separating component 256 can obtain the data subcarriers corresponding to the UE 104 or related channel for processing.

In method 800, at Block 810, the set of data subcarriers can be processed to obtain data transmitted in the UW-OFDM waveform. In an aspect, processing component 258, e.g., in conjunction with processor(s) 212, memory 216, transceiver 202, UE communicating component 242, etc., can process the set of data subcarriers to obtain data transmitted in the UW-OFDM waveform for the UE 104 or associated channel, where the UW-OFDM waveform can have FDMed communications for multiple users or channels.

In method 800, optionally at Block 812, an indication of a proportion of the at least one set of redundant subcarriers that include a first set of redundant subcarriers can be received. In an aspect, configuration processing component 260, e.g., in conjunction with processor(s) 212, memory 216, transceiver 202, UE communicating component 242, etc., can receive (e.g., from a base station 102 or other device transmitting the UW-OFDM waveform), the indication of the proportion of the at least one set of redundant subcarriers that include the first set of redundant subcarriers. In this example, given a set of subcarriers demapped from the UW-OFDM waveform, separating component 256 can determine a number of subcarriers and/or subcarrier locations to use in separating redundant subcarriers from corresponding data subcarriers for processing. For example, referring to FIG. 5, given the indication of the proportion of the first of redundant subcarriers, separating component 256 can determine a number of the subcarriers demapped based on SC mapping to separate and/or can determine how to separate the redundant subcarriers from the corresponding data subcarriers based on the proportion (e.g., based on determining the number of redundant subcarriers using the proportion indication and/or the formulas described above for generating the permutations of subcarriers).

In method 800, optionally at Block 814, one or more parameters related to the multiplexed set of data subcarriers can be received. In an aspect, configuration processing component 260, e.g., in conjunction with processor(s) 212, memory 216, transceiver 202, UE communicating component 242, etc., can receive (e.g., from a base station 102 or other device transmitting the UW-OFDM waveform) the one or more parameters related to the multiplexed set of data subcarriers. As described, for example, the one or more parameters may indicate whether the same or different permutation matrix or process is used to interleave different sets of subcarriers with corresponding redundant subcarriers, whether the same or different SC mapping is used to map the subcarriers as input to an IFFT, etc. In any case, for example, the one or more parameters may indicate methods and/or parameters used to generate the multiplex the users/ channels. Thus, in some examples, the methods and/or parameters can be used to determine how to demap the subcarriers and/or separate the redundant subcarriers from the data subcarriers, as described above. In other examples, the methods and/or parameters can be implicitly derived by the UE 104 based on certain conditions, such as channel quality for the UE 104, distance between the UE 104 and another UE or base station 102, etc.

In one example, demapping component 254 can demap the redundant SCs for at least a first set of data subcarriers from an allocation of resources for the corresponding user/ channel in frequency. For example, UE communicating component 242 can have received the allocation of resources for receiving the UW-OFDM waveform including the user/ channel (e.g., PDCCH or PDSCH resources for a given user or channel). In another example, demapping component 254 can demap the redundant SCs for at least the first set of data subcarriers from a bandwidth larger than the allocation of resources for the corresponding user/channel in frequency. In yet another example, demapping component 254 can demap the redundant SCs for at least a first set of data subcarriers in subcarriers of other users/channels in frequency. In this example, to avoid overlap of resources, a user/channel specific redundant SC shift can be used in the frequency domain.

In one example, such as where subcarriers of a resource allocation for the first UE 104 are used for mapping the set of redundant SCs for a second set of data subcarriers for other users, in method 800, optionally at Block 816, an indication that a set of subcarriers overlapping the at least one set of redundant subcarriers are not available can be received. In an aspect, configuring component 360, e.g., in conjunction with processor(s) 312, memory 316, transceiver 302, BS communicating component 342, etc., can receive (e.g., from the base station 102), the indication that the set of subcarriers overlapping the at least one set of redundant subcarriers (which may be used for communications to a second user) are not available. For example, configuration processing component 260 can receiving the indication using RRC signaling, MAC-CE, DCI, etc. In this example, processing component 258 can process the data subcarriers allocated to the UE 104 by rate matching around the subcarriers indicated as overlapped.

Figure 9:
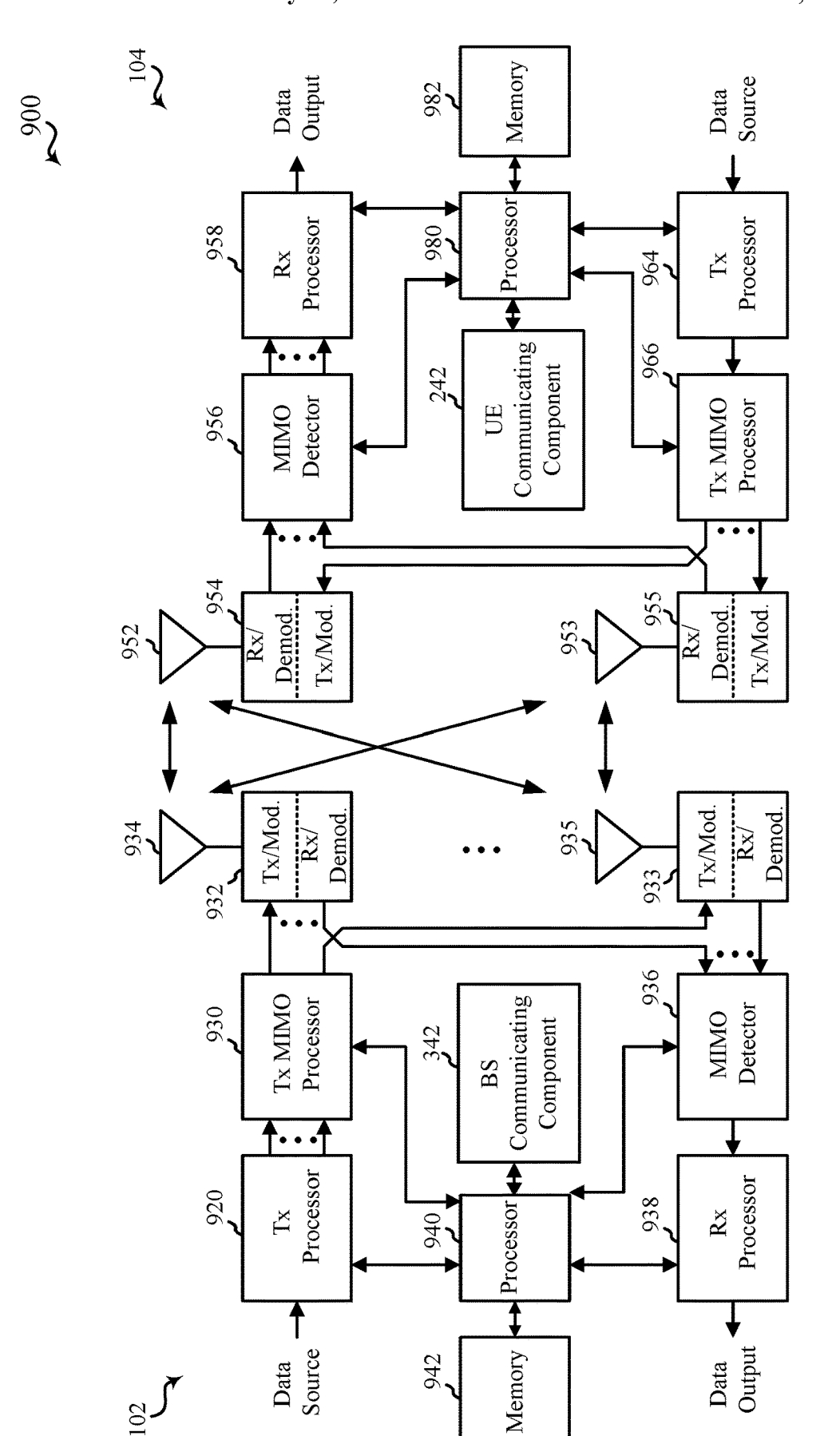
FIG. 9 is a block diagram illustrating an example of a multiple-input multiple-output (MIMO) communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a UE communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for single carrier-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 900.

The following aspects are illustrative only and aspects thereof may be combined with aspects of other embodiments or teaching described herein, without limitation.

Aspect 1 is a method for wireless communications including multiplexing, in frequency and to generate a multiplexed set of data subcarriers, a first set of data subcarriers for a first user or a first channel with a second set of data subcarriers for a second user or a second channel, adding at least one set of redundant subcarriers to the multiplexed set of data subcarriers to be transmitted in a UW-OFDM waveform to produce at least one of head samples or tail samples for the UW-OFDM waveform, mapping the multiplexed set of data subcarriers and the at least one set of redundant subcarriers as input to an IFFT, and generating the UW-OFDM waveform based on an output of the IFFT.

In Aspect 2, the method of Aspect 1 includes interleaving, based on a permutation matrix, the at least one set of redundant subcarriers with the multiplexed set of data subcarriers to generate a permutation of subcarriers, where mapping the multiplexed set of data subcarriers and the at least one set of redundant subcarriers includes mapping the permutation of subcarriers as input to the IFFT.

In Aspect 3, the method of Aspect 2 includes where the permutation matrix manages transmit power of at least one of the first set of data subcarriers or the second set of data subcarriers.

In Aspect 4, the method of any of Aspects 1 to 3 includes where the at least one set of redundant subcarriers includes a first set of redundant subcarriers that are a function of the first set of data subcarriers and a second set of redundant subcarriers that are a function of the second set of data subcarriers.

In Aspect 5, the method of Aspect 4 includes generating a permutation of subcarriers at least in part by interleaving, based on a first permutation matrix, the first set of redundant subcarriers with the first set of data subcarriers, and interleaving, based on one of the first permutation matrix or a second permutation matrix that is different from the first permutation matrix, the second set of redundant subcarriers with the second set of data subcarriers, where mapping the multiplexed set of data subcarriers and the at least one set of redundant subcarriers includes mapping the permutation of subcarriers as input to the IFFT.

In Aspect 6, the method of Aspect 5 includes transmitting, to the first user or for the first channel, an indication of a proportion of the at least one set of redundant subcarriers that include the first set of redundant subcarriers.

In Aspect 7, the method of Aspect 6 includes where interleaving the first set of redundant subcarriers results in adding, to the input of the IFFT, the first set of data subcarriers based on the proportion.

In Aspect 8, the method of any of Aspects 4 to 7 includes where mapping the multiplexed set of data subcarriers and the at least one set of redundant subcarriers includes mapping the first set of redundant subcarriers with the first set of data subcarriers using a first subcarrier mapping matrix, and mapping the second set of redundant subcarriers with the second set of data subcarriers using one of the first subcarrier matrix or a second subcarrier matrix that is different from the first subcarrier matrix.

In Aspect 9, the method of Aspect 8 includes transmitting, to the first user or for the first channel, an indication of a proportion of the at least one set of redundant subcarriers that include the first set of redundant subcarriers.

In Aspect 10, the method of Aspect 9 includes where mapping the first set of redundant subcarriers results in adding, to the input of the IFFT, the first set of data subcarriers based on the proportion.

In Aspect 11, the method of any of Aspects 1 to 10 includes where the at least one set of redundant subcarriers is a function of the first set of data subcarriers and the second set of data subcarriers.

In Aspect 12, the method of any of Aspects 1 to 11 includes where the at least one set of redundant subcarriers are within an allocation of resources for the first user or the first channel or the second user or the second channel.

In Aspect 13, the method of any of Aspects 1 to 12 includes where the at least one set of redundant subcarriers span a larger bandwidth than an allocation of resources for the first user or the first channel or the second user or the second channel.

In Aspect 14, the method of any of Aspects 1 to 13 includes where a portion of the at least one set of redundant subcarriers for the first set of data subcarriers are at least partially within an allocation of resources for the second user or the second channel.

In Aspect 15, the method of Aspect 14 includes transmitting, to the second user, an indication that a set of subcarriers that overlap the at least one set of redundant subcarriers are not available.

In Aspect 16, the method of any of Aspects 1 to 15 includes transmitting, to at least the first user, one or more parameters related to the multiplexed set of data subcarriers, where multiplexing the first set of data subcarriers and the second set of data subcarriers is based on the one or more parameters.

In Aspect 17, the method of any of Aspects 1 to 16 includes deriving one or more parameters related to generating the multiplexed set of data subcarriers.

Aspect 18 is a method for wireless communications including receiving a UW-OFDM waveform having head samples or tail samples corresponding to at least one set of redundant subcarriers, generating a mapping of subcarriers by performing a FFT of the UW-OFDM waveform, demapping, from the mapping of subcarriers, the at least one set of redundant subcarriers and a multiplexed set of data subcarriers, and processing a first set of data subcarriers of the multiplexed set of data subcarriers to obtain data transmitted in the UW-OFDM waveform.

In Aspect 19, the method of Aspect 18 includes where demapping the at least one set of redundant subcarriers and the multiplexed set of data subcarriers includes demapping a permutation of subcarriers, and separating, based on a permutation matrix, the permutation of subcarriers as the at least one set of redundant subcarriers and the multiplexed set of data subcarriers.

In Aspect 20, the method of any of Aspects 18 or 19 includes where demapping the at least one set of redundant subcarriers and the multiplexed set of data subcarriers includes demapping a permutation of subcarriers, and separating, based on a permutation matrix, a first set of redundant subcarriers, which are a function of the first set of data subcarriers, from the first set of data subcarriers in the permutation of subcarriers.

In Aspect 21, the method of Aspect 20 includes receiving an indication of a proportion of the at least one set of redundant subcarriers that include the first set of redundant subcarriers.

In Aspect 22, the method of Aspect 21 includes where demapping the at least one set of redundant subcarriers includes determining a number of the first set of data subcarriers based on the proportion.

In Aspect 23, the method of any of Aspects 18 to 22 includes where demapping the at least one set of redundant subcarriers includes demapping a first set of redundant subcarriers, which are a function of the first set of data subcarriers, from the first set of data subcarriers.

In Aspect 24, the method of Aspect 23 includes receiving an indication of a proportion of the at least one set of redundant subcarriers that include the first set of redundant subcarriers.

In Aspect 25, the method of Aspect 24 includes where demapping the first set of redundant subcarriers includes determining a number of the first set of data subcarriers based on the proportion.

In Aspect 26, the method of any of Aspects 18 to 25 includes where demapping the at least one set of redundant subcarriers and the multiplexed set of data subcarriers includes demapping a permutation of subcarriers, and separating, based on a permutation matrix, the at least one set of redundant subcarriers, which are a function of the first set of data subcarriers and a second set of data subcarriers in the multiplexed set of data subcarriers.

In Aspect 27, the method of any of Aspects 18 to 26 includes where the at least one set of redundant subcarriers are within an allocation of resources for a first user or a first channel or a second user or a second channel.

In Aspect 28, the method of any of Aspects 18 to 27 includes where the at least one set of redundant subcarriers span a larger bandwidth than an allocation of resources for a first user or a first channel or a second user or a second channel.

In Aspect 29, the method of any of Aspects 18 to 28 includes where a portion of the at least one set of redundant subcarriers for the first set of data subcarriers are at least partially within an allocation of resources for a second user or a second channel.

In Aspect 30, the method of Aspect 29 includes receiving an indication that a set of subcarriers that overlap the at least one set of redundant subcarriers are not available.

In Aspect 31, the method of any of Aspects 18 to 30 includes receiving one or more parameters related to the multiplexed set of data subcarriers, where separating the first set of data subcarriers from the multiplexed set of data subcarriers is based on the one or more parameters.

In Aspect 32, the method of any of Aspects 18 to 31 includes deriving one or more parameters related to separating the first set of data subcarriers from the multiplexed set of data sub carriers.

Aspect 33 is an apparatus for wireless communication including a transceiver, a memory configured to store instructions, and one or more processors communicatively coupled with the memory and the transceiver, where the one or more processors are configured to execute the instructions to cause the apparatus to perform any of the methods of Aspects 1 to 32.

Aspect 34 is an apparatus for wireless communication including means for performing any of the methods of Aspects 1 to 32.

Aspect 35 is a computer-readable medium including code executable by one or more processors for wireless communications, the code including code for performing any of the methods of Aspects 1 to 32.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to:
multiplex, in frequency and to generate a multiplexed set of data subcarriers, a first set of data subcarriers with a second set of data subcarriers, wherein the first set of data subcarriers are for a first user or a first physical layer channel, and wherein the second set of data subcarriers are for a second user different from the first user or a second physical layer channel different from the first physical layer channel;
add at least one set of redundant subcarriers to the multiplexed set of data subcarriers to be transmitted in a unique-word orthogonal frequency division multiplexing (UW-OFDM) waveform to produce at least one of head samples or tail samples for the UW-OFDM waveform;
map the multiplexed set of data subcarriers and the at least one set of redundant subcarriers as input to an inverse fast Fourier transform (IFFT); and
generate the UW-OFDM waveform based on an output of the IFFT.

2. The apparatus of claim 1, wherein the one or more processors are further configured to interleave, based on a permutation matrix, the at least one set of redundant subcarriers with the multiplexed set of data subcarriers to generate a permutation of subcarriers, wherein the one or more processors are configured to map the multiplexed set of data subcarriers and the at least one set of redundant subcarriers at least in part by mapping the permutation of subcarriers as input to the IFFT.

3. The apparatus of claim 2, wherein the permutation matrix manages transmit power of at least one of the first set of data subcarriers or the second set of data subcarriers.

4. The apparatus of claim 1, wherein the at least one set of redundant subcarriers includes a first set of redundant subcarriers that are a function of the first set of data subcarriers and a second set of redundant subcarriers that are a function of the second set of data subcarriers.

5. The apparatus of claim 4, wherein the one or more processors are further configured to generate a permutation of subcarriers at least in part by:

interleaving, based on a first permutation matrix, the first set of redundant subcarriers with the first set of data subcarriers; and interleaving, based on one of the first permutation matrix or a second permutation matrix that is different from the first permutation matrix, the second set of redundant subcarriers with the second set of data subcarriers, wherein the one or more processors are configured to map the multiplexed set of data subcarriers and the at least one set of redundant subcarriers at least in part by mapping the permutation of subcarriers as input to the IFFT.

6. The apparatus of claim 5, wherein the one or more processors are further configured to transmit, to the first user or for the first physical layer channel, an indication of a proportion of the at least one set of redundant subcarriers that include the first set of redundant subcarriers, wherein interleaving the first set of redundant subcarriers results in adding, to the input of the IFFT, the first set of data subcarriers based on the proportion.

7. The apparatus of claim 4, wherein the one or more processors are configured to map the multiplexed set of data subcarriers and the at least one set of redundant subcarriers at least in part by:

mapping the first set of redundant subcarriers with the first set of data subcarriers using a first subcarrier mapping matrix; and mapping the second set of redundant subcarriers with the second set of data subcarriers using one of the first subcarrier mapping matrix or a second subcarrier mapping matrix that is different from the first subcarrier mapping matrix.

8. The apparatus of claim 7, wherein the one or more processors are further configured to transmit, to the first user or for the first physical layer channel, an indication of a proportion of the at least one set of redundant subcarriers that include the first set of redundant subcarriers, wherein mapping the first set of redundant subcarriers results in adding, to the input of the IFFT, the first set of data subcarriers based on the proportion.

9. The apparatus of claim 1, wherein the at least one set of redundant subcarriers is a function of the first set of data subcarriers and the second set of data subcarriers.

10. The apparatus of claim 1, wherein the at least one set of redundant subcarriers are within an allocation of resources for the first user or the first physical layer channel or the second user or the second physical layer channel.

11. The apparatus of claim 1, wherein the at least one set of redundant subcarriers span a larger bandwidth than an allocation of resources for the first user or the first physical layer channel or the second user or the second physical layer channel.

12. The apparatus of claim 1, wherein a portion of the at least one set of redundant subcarriers for the first set of data subcarriers are at least partially within an allocation of resources for the second user or the second physical layer channel.

13. The apparatus of claim 1, wherein the one or more processors are configured to transmit, to at least the first user, one or more parameters related to the multiplexed set of data subcarriers, wherein the one or more processors are configured to multiplex the first set of data subcarriers and the second set of data subcarriers based on the one or more parameters.

14. A method for wireless communications, comprising:

multiplexing, in frequency and to generate a multiplexed set of data subcarriers, a first set of data subcarriers with a second set of data subcarriers, wherein the first set of data subcarriers are for a first user or a first physical layer channel, and wherein the second set of data subcarriers are for a second user different from the first user or a second physical layer channel different from the second physical layer channel;

adding at least one set of redundant subcarriers to the multiplexed set of data subcarriers to be transmitted in a unique-word orthogonal frequency division multiplexing (UW-OFDM) waveform to produce at least one of head samples or tail samples for the UW-OFDM waveform;

mapping the multiplexed set of data subcarriers and the at least one set of redundant subcarriers as input to an inverse fast Fourier transform (IFFT); and generating the UW-OFDM waveform based on an output of the IFFT.

15. The method of claim 14, further comprising interleaving, based on a permutation matrix, the at least one set of redundant subcarriers with the multiplexed set of data subcarriers to generate a permutation of subcarriers, wherein mapping the multiplexed set of data subcarriers and the at least one set of redundant subcarriers includes mapping the permutation of subcarriers as input to the IFFT.

16. The method of claim 15, wherein the permutation matrix manages transmit power of at least one of the first set of data subcarriers or the second set of data subcarriers.

17. The method of claim 14, wherein the at least one set of redundant subcarriers includes a first set of redundant subcarriers that are a function of the first set of data subcarriers and a second set of redundant subcarriers that are a function of the second set of data subcarriers.

18. The method of claim 17, further comprising generating a permutation of subcarriers at least in part by:

interleaving, based on a first permutation matrix, the first set of redundant subcarriers with the first set of data subcarriers; and interleaving, based on one of the first permutation matrix or a second permutation matrix that is different from the first permutation matrix, the second set of redundant subcarriers with the second set of data subcarriers, wherein mapping the multiplexed set of data subcarriers and the at least one set of redundant subcarriers includes mapping the permutation of subcarriers as input to the IFFT.

19. The method of claim 18, further comprising transmitting, to the first user or for the first physical layer channel, an indication of a proportion of the at least one set of redundant subcarriers that include the first set of redundant subcarriers, wherein interleaving the first set of redundant subcarriers results in adding, to the input of the IFFT, the first set of data subcarriers based on the proportion.

20. The method of claim 17, wherein mapping the multiplexed set of data subcarriers and the at least one set of redundant subcarriers includes:

mapping the first set of redundant subcarriers with the first set of data subcarriers using a first subcarrier mapping matrix; and mapping the second set of redundant subcarriers with the second set of data subcarriers using one of the first subcarrier mapping matrix or a second subcarrier mapping matrix that is different from the first subcarrier mapping matrix.

21. The method of claim 20, further comprising transmitting, to the first user or for the first physical layer channel, an indication of a proportion of the at least one set of redundant subcarriers that include the first set of redundant subcarriers, wherein mapping the first set of redundant subcarriers results in adding, to the input of the IFFT, the first set of data subcarriers based on the proportion.

22. The method of claim 14, wherein the at least one set of redundant subcarriers is a function of the first set of data subcarriers and the second set of data subcarriers.

23. The method of claim 14, wherein the at least one set of redundant subcarriers are within an allocation of resources for the first user or the first physical layer channel or the second user or the second physical layer channel.

24. The method of claim 14, wherein the at least one set of redundant subcarriers span a larger bandwidth than an allocation of resources for the first user or the first physical layer channel or the second user or the second physical layer channel.

25. The method of claim 14, wherein a portion of the at least one set of redundant subcarriers for the first set of data subcarriers are at least partially within an allocation of resources for the second user or the second physical layer channel.

26. The method of claim 14, further comprising transmitting, to at least the first user, one or more parameters related to the multiplexed set of data subcarriers, wherein multiplexing the first set of data subcarriers and the second set of data subcarriers is based on the one or more parameters.

* * * * *